Feb. 1, 1944.   J. R. HORRIGAN   2,340,325
PIPE COATING APPARATUS
Filed May 18, 1942   3 Sheets-Sheet 1
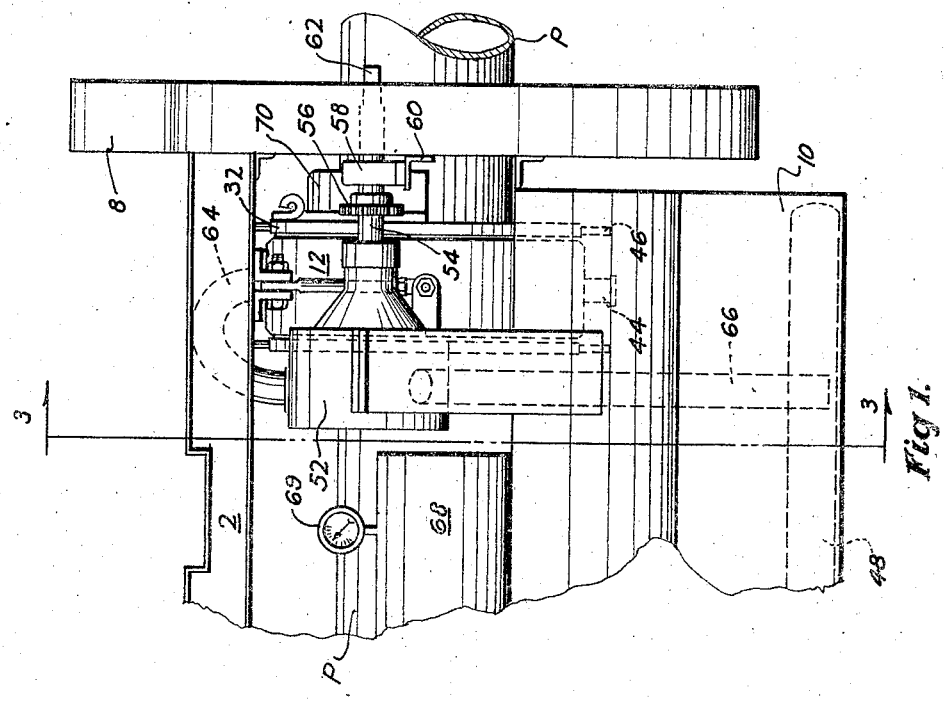
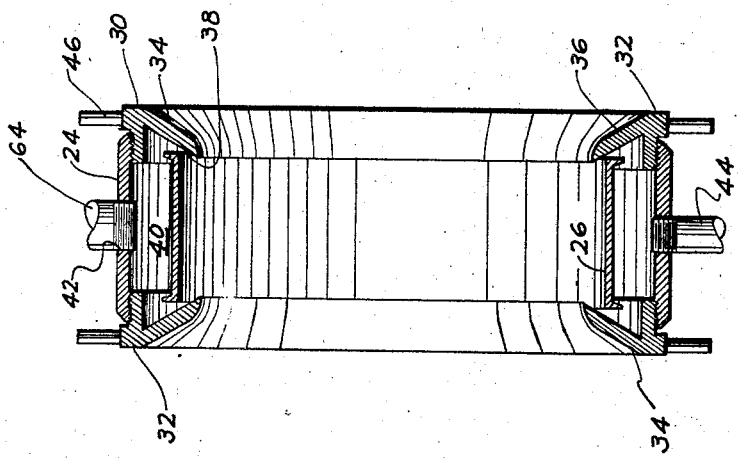
INVENTOR.
J. R. Horrigan.
BY
ATTORNEY.

Feb. 1, 1944.                J. R. HORRIGAN                2,340,325
                         PIPE COATING APPARATUS
                         Filed May 18, 1942          3 Sheets-Sheet 3

INVENTOR.
J. R. Horrigan.
BY C. M. McKnight
ATTORNEY.

Patented Feb. 1, 1944

2,340,325

UNITED STATES PATENT OFFICE 2,340,325

PIPE COATING APPARATUS

Joseph R. Horrigan, Houston, Tex., assignor to Lewis Perrault and Ainslie Perrault, composing the copartnership of Perrault Brothers, Tulsa, Okla.

Application May 18, 1942, Serial No. 443,537

10 Claims. (Cl. 91—44)

This invention relates to an apparatus for coating cylindrical bodies such as pipe, tubing and the like with a protective covering of bituminous or asphaltic material and the like.

Heretofore traveling pipe coating machines utilizing the pipe as a track have been bulksome, top heavy and cumbersome in that the coating supply tank has been supported in the top of the apparatus along with the necessary actuating mechanism. Furthermore, coating shoes for applying the coating material to the pipe have necessarily utilized spacer members to provide a clearance between the inner periphery of the shoe and the pipe, in order to provide a desired thickness, said shoe being resiliently mounted for assuring proper position of the shoe with respect to the pipe. In most instances the coating is discharged from a hopper above the pipe into the shoe to be directly discharged onto the top surface of the pipe where it is allowed to flow into the lower portion of the shoe acting as a bath or reservoir to assure coating of the under surface of the pipe.

An important object of this invention is to provide a coating apparatus wherein the coating material is maintained under pressure and discharged against the entire circumferential surface of a portion of the pipe at one time and in the same plane.

And a further object of this invention is to provide a traveling coating apparatus for a pipe or the like having an annular coating slot capable of variable adjustment in order to provide any desired uniform thickness with a minimum use of coating material.

And still a further object of this invention is to provide a coating apparatus adapted to travel along a pipe wherein the coating shoe is mounted on the machine to permit adjustment of the coating shoe both vertically and horizontally relative to the pipe and thereby assure perfect alignment with the pipe.

And an additional object of this invention is to provide a coating apparatus adapted to travel on a pipe wherein the coating supply is maintained below the pipe, and the coating material is drawn into a coating shoe having a pair of annular coating slots simultaneously discharging the material over the entire surface of the pipe, said excess coating material being allowed to fall back into the coating supply where it is recycled to the coating shoe.

Other objects and advantages of the invention will be evident from the following detailed description read in conjunction with the accompanying drawings which illustrate one form of my invention.

Figure 1 is a fragmentary side elevational view of a coating machine supported on a pipe with certain parts omitted for clarity.

Figure 2 is a sectional elevational view of the coating shoe.

Figure 3:
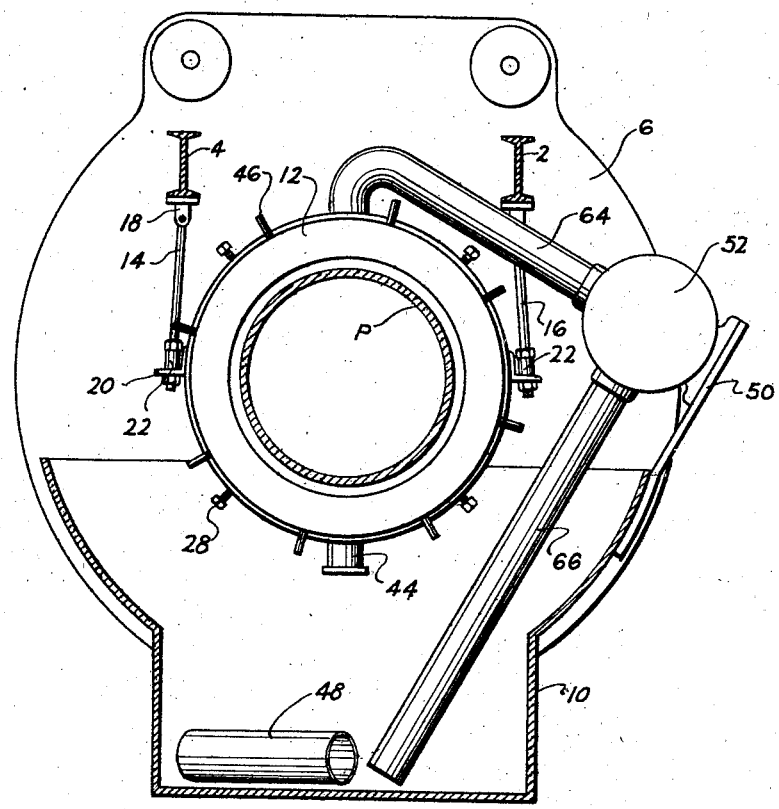
Figure 3 is a view taken on lines 3—3 of Figure 1 with certain parts omitted for clarity.
Figure 4:
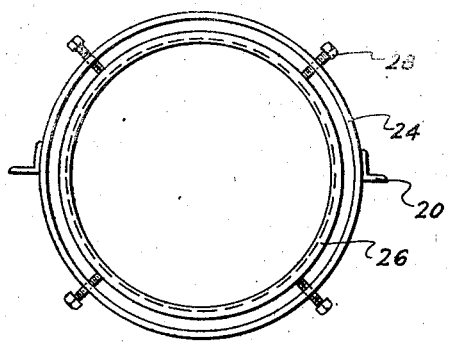
Figure 4 is a front elevational view of the coating shoe with the adjustable ring omitted.
Figure 5:
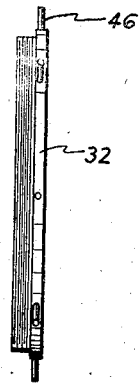
Figure 5 is a side view of one of the rings.

Referring to the drawings in detail, the coating machine is mounted on a frame comprising longitudinal side members 2 and 4 supporting traction wheels (not shown) said machine being part of a coating and wrapping machine disclosed in applicant's co-pending application No. 443,538, filed on even date herewith.

A substantially circular apertured plate 6 is secured at one end of the machine for supporting the wrapping mechanism (not shown) and covered by a shield 8. A sump tank 10 is supported by the frame below the pipe P and extends substantially the length of the machine.

An annular coating shoe 12 is suspended from the side members 2 and 4 by threaded rods 14 and 16. The upper end portions of the rods are apertured in order to cooperate with spaced bracket members 18 carried by the side members. A bolt and nut secures the rods in the brackets to provide an adjustable yoke connection. The outer periphery of the coating shoe is provided with diametrically opposed brackets 20 to which the threaded rods 14 and 16 are adjustably secured by the clamping nuts 22. From the foregoing it will be apparent that the annular shoe 12 can be radially adjusted with limitations with respect to the pipe P.

Referring to Figure 2 the coating shoe comprises a pair of cylindrical housing members 24 and 26 of different diameters, with the inner cylinder 26 disposed in the outer cylinder 24. The cylinders are secured in proper spaced relation by a plurality of circumferentially spaced bolts 28 extending through cylinder 24 and bearing against the outer periphery of cylinder 26 to allow radial adjustment between the cylinders. The inner periphery of cylinder 24 adjacent its edge portions is provided with female threads 30 for receiving on each side a threaded annulus or apertured ring 32. The ring 32 is provided with an angularly disposed annular flange 34 providing a bevelled face 36. The threaded cooperation of ring 32 with the cylinder 24 allows movement of the flange toward and away from the edge of inner cylinder 26. It will be apparent that two ring members 32 are utilized to provide a pair of adjustable circular coating slots 38 to be hereinafter referred to. Coating material enters a chamber 40 through an aperture 42 communicating with a rotary pump to be hereinafter referred to. A drain plug 44 is disposed diametrically opposite from aperture 42 and allows emitting of coating material from the chamber 40 when the shoe is not in use. The outer periphery of rings 32 are provided with circumferentially spaced handles 46 in order to easily manipulate the threading of the rings with cylinder 24.

The asphaltic material or "dope" is preferably maintained in the sump tank 10, from which it is fed to the coating shoe. A heating element 48 is preferably arranged diagonally across the sump tank for heating the coating material to be applied to the pipe.

Referring to Figure 3, the upper portion of one side of the sump tank 10 is provided with a bracket 50 to which is secured a rotary pump 52. As shown in Figure 1, a stud shaft 54 extends from the pump and is provided with a toothed sprocket 56 connecting with a drive sprocket of a drive mechanism (not shown) by a sprocket chain (not shown). The shaft 54 is journaled in a bearing 58 supported on a bracket 60 secured to the end plate 6. The shaft extends through the bearing 58 and an aperture (not shown) in plate 6 to the outside of the apparatus as shown at 62. The outer end portion of the shaft 54 is shaped to receive any suitable tool allowing manual rotation of the pump prior to rotation of the machine when the coating material may be cold.

A supply conduit 64 provides communication between the shoe inlet aperture 42 and the pump 52. A conduit 66 provides communication between the pump, and the bottom of the sump tank 10 where it will be apparent that rotation of the pump causes flow of coating material from the sump tank into the pump and through conduit 64 into chamber 40 of the shoe. A fuel tank 68 is supported on a sump 10 for supplying fuel to the heater 48. The tank is provided with a suitable pressure gauge 69.

Operation

As the machine travels along the pipe through actuation of the drive mechanism (not shown) the pump is operated through the drive sprocket 56 wherein heated asphaltic coating material is pumped from sump tank 10 and discharged through conduit 64 into the chamber 40. Any desired adjustment of the rings 32 can be predetermined in order to discharge the coating material through the annular coating slots 38 and on to the pipe. The peripheral edge of flange 36 extends inwardly beyond the inner periphery of the cylinder 26 so that coating material will be sprayed onto the pipe in a direction toward the middle or central plane of the shoe. In this manner a uniform thickness of coating material is applied to the entire surface of the pipe, at one time, and in the same plane thereby eliminating the use of excess coating material and applying only a minimum amount for any specified coating thickness.

Figure 9:
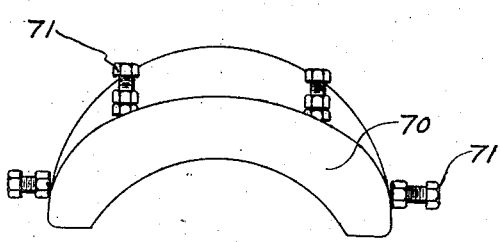
Figure 9 is a front elevation of the coating spreader.

As the coating material is applied to the pipe, it is practically free from holidays, bubbles and the like, due to the volume of hot coating material washing out any bubbles that may form. However, in the event any bubbles or holidays may occur, the machine is to be equipped with a semi-circular spreader member 70 (Figs. 1 and 9) suitably connected by hinging or the like to the rear of the coating shoe 12 preferably on a ring 36. The spreader 70 is adapted to overlie the top surface of the pipe in spaced relation thereto and break up any holidays, bubbles or the like caused by application of the coating material. The spreader 70 is provided with adjustable bolts 71 adapted to contact the pipe to create a clearance therebetween. Excess coating material falls back into the sump tank 10 where it is recirculated by pump 52 to the shoe 12 thereby eliminating any waste whatsoever in the coating material.

From the foregoing it will be apparent delivery of coating material from the sump tank 10 by the pump to the coating shoe maintains the coating material in chamber 40 under pressure to be discharged through the slots 38 with considerable volume. This is particularly advantageous in assuring the coating of any pits or other abrasions that may be present in the pipe.

Figure 6:
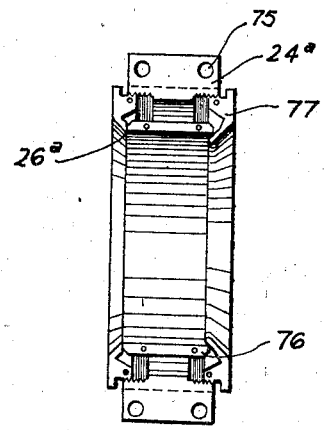
Figure 6 is a sectional elevational view of a modified form of the coating shoe.
Figure 7:
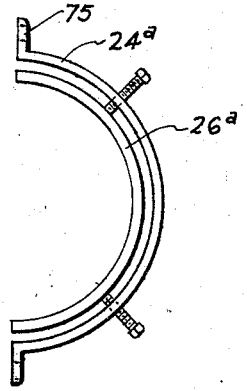
Figure 7 is a front elevational view of one portion thereof.
Figure 8:
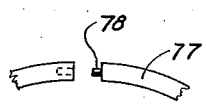
Figure 8 is a fragmentary elevational view showing the dowel connection for the modified rings.

Figures 6, 7 and 8 show a modification of a split or divided coating shoe wherein the construction is substantially the same as in the preferred form except that the cylinder and ring members are divided to provide a segmental shoe comprising a pair of semi-circular members 24a and 26a. The segments 24a forming the outer cylinders are provided with diametrically opposed flanges 75 adapted to receive bolts (not shown) for securing them together. In like manner the inner cylinder segments are provided with cooperating flanges 76 (not shown in Fig. 7) adapted to be secured together by bolts (not shown). As clearly shown in Figure 8, the cooperating threaded rings 77 are divided and are secured together by a dowel pin and recess 78 or the like in order to provide a unitary ring adapted for threaded engagement with the segmental cylinders. It will be apparent that providing a segmental coating shoe allows easy assembly or removal of the shoe from the pipe without the necessity of removing the machine entirely off the pipe.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. A device for applying coating material to a pipe comprising an annular container surrounding the pipe in spaced non-engaging relation thereto, said container having a pair of continuous circular coating slots in its inner periphery, and annular lips projecting inwardly toward the pipe, from the ends of the container in close proximity to the slots and having annular inner inclined surfaces extending toward one another, one of said surfaces being inclined in one direction and the other surface being inclined in the opposite direction.

2. A device for applying coating material to a pipe comprising an annular container surrounding the pipe, said container having a pair of continuous circular coating slots in its inner periphery, and means providing adjustment of the circular coating slots to vary the size of the slots.

3. In a device for applying coating material to a pipe comprising a coating shoe encircling the pipe and formed by a pair of cylinders of different diameters arranged in radial spaced relation to each other, ring members cooperating with the cylinders to provide a container, each of said rings having means adjustable with respect to the cylinders and cooperating therewith to provide continuous annular coating slots at the edges of the cylinder of smaller diameter for discharging coating material from the container onto the pipe.

4. In a device for applying coating material to a pipe comprising a coating shoe encircling the pipe and formed from a pair of cylinders of different diameters arranged in radially spaced relation to each other, the cylinder of larger diameter being wider than the other cylinder ring members cooperating with the cylinders to provide an annulus and annular slots at the edges of the cylinder of smaller diameter, said rings having means adjustable with respect to the cylinders to vary the sizes of the slots.

5. A device for applying coating material to a pipe comprising an annular container consisting of inner and outer cylinders, means operatively connecting the cylinders and holding them in spaced relation radially of the container, and rings secured to the outer cylinder and provided with annular lips which cooperate with the edges of the inner cylinder to form annular slots for the discharge of coating material from the container.

6. A device for applying coating material to a pipe comprising an annular container consisting of inner and outer cylinders, means operatively connecting the cylinders and holding them in spaced relation radially of the container, and rings secured to the outer cylinder and provided with annular lips which cooperate with the edges of the inner cylinder to form annular slots for the discharge of coating material from the container, the inner surfaces of the lips being flared in opposite directions.

7. A device for applying coating material to a pipe comprising an annular container consisting of inner and outer cylinders, means operatively connecting the cylinders and holding them in spaced relation radially of the container, and rings secured to the outer cylinder and provided with annular lips which cooperate with the edges of the inner cylinder to form annular slots for the discharge of coating material from the container, said lips being oppositely inclined and terminating inwardly of the inner surface of the inner cylinder.

8. A device for applying coating material to a pipe comprising an annular container consisting of inner and outer cylinders, means operatively connecting the cylinders and holding them in spaced relation radially of the container, rings forming parts of the container, and means adjustably securing said rings to the outer cylinder, said rings being provided with annular lips which cooperate with the edges of the inner cylinder to form variable annular slots for the discharge of coating material from the container.

9. A coating shoe comprising a substantially annular housing adapted to surround a pipe in spaced relation thereto and provided with a substantially annular chamber, said housing including a ring and means adjustably connecting said ring to a portion of the housing and forming with another portion of the housing, a variable annular slot at the inner periphery of the housing, said slot communicating with the chamber and arranged to discharge coating from the chamber in a substantially annular stream onto the pipe.

10. A coating shoe comprising a substantially annular housing adapted to surround a pipe in spaced relation thereto and provided with a substantially annular chamber, rings forming parts of the housing, and means adjustably connecting said rings to opposite portions of the housing to provide therewith annular slots through which a coating may be discharged from the chamber in substantially annular streams onto the pipe.

JOSEPH R. HORRIGAN.